United States Patent
Ikuta

(10) Patent No.: US 6,517,021 B2
(45) Date of Patent: Feb. 11, 2003

(54) DUAL-BEARING REEL ANTI-REVERSE MECHANISM

(75) Inventor: Takeshi Ikuta, Sakai (JP)

(73) Assignee: Shimano Inc., Sakai (JP)

( * ) Notice: Subject to any disclaimer, the term of this patent is extended or adjusted under 35 U.S.C. 154(b) by 12 days.

(21) Appl. No.: 09/934,517

(22) Filed: Aug. 23, 2001

(65) Prior Publication Data

US 2002/0023978 A1 Feb. 28, 2002

(30) Foreign Application Priority Data

Aug. 30, 2000 (JP) ........................................ 2000-261523

(51) Int. Cl.[7] .............................................. A01K 59/02
(52) U.S. Cl. ..................... 242/247; 242/298; 242/301
(58) Field of Search ................................ 242/245, 247, 242/296, 297, 298, 299, 301, 307

(56) References Cited

U.S. PATENT DOCUMENTS

| 3,989,204 A | | 11/1976 | Lemery | |
|---|---|---|---|---|
| 4,899,953 A | | 2/1990 | Toda | |
| 5,037,039 A | * | 8/1991 | Toda | 242/223 |
| 5,201,870 A | * | 4/1993 | Newell | 242/298 |
| 5,415,359 A | | 5/1995 | Ikuta | |
| 5,601,246 A | | 2/1997 | Takahashi | |
| 6,039,278 A | * | 3/2000 | Tao | 242/246 |
| 6,056,223 A | * | 5/2000 | Kirby | 242/306 |

* cited by examiner

*Primary Examiner*—Emmanuel Marcelo
(74) *Attorney, Agent, or Firm*—Shinjyu Global IP Counselors, LLP

(57) ABSTRACT

Anti-reverse mechanism furnished with graspers that under friction with the ratchet wheel urge the ratchet pawls, to keep the graspers from being deformed when the spool shaft is removed/attached. The anti-reverse mechanism 9, for drag operation in a dual-bearing reel, is furnished with a ratchet wheel 50, ratchet pawls 51, braces 55, and graspers 52. The ratchet wheel has a plurality of saw-teeth 50*a* and is fitted non-rotatably, yet permitted axial shift, to a friction disk 36 co-operational with the spool 3. The ratchet pawls are mounted to a side plate 10 pivotally between a contact posture where their leading ends contact the saw-teeth, and a separated posture where they are parted away from the teeth. The braces are provided on the side plate, and brace the ratchet wheel against the side plate. The graspers are fitted to the ratchet wheel, and urge the ratchet wheel toward the separated posture when the ratchet wheel is rotated in the line wind-in direction, and urge it toward the contact posture when it is rotated in the line reel-out direction.

7 Claims, 6 Drawing Sheets

DUAL-BEARING REEL ANTI-REVERSE MECHANISM

BACKGROUND OF THE INVENTION

1. Technical Field

The present invention relates to anti-reverse mechanisms; in particular to dual-bearing reel anti-reverse mechanisms for governing rotation, in the line reel-out direction, of the spool mounted rotatively in the reel body of the dual-bearing reel.

2. Description of Related Art

In general anti-reverse mechanisms for prohibiting when the drag is on, rotation in the line reel-out direction of a link member co-operational with the spool, are fitted to drag devices in dual-bearing reels. In the case for example of star-drag model drag devices provided surrounding the handle shaft, the anti-reverse mechanism is fitted to the handle shaft. In the case also of lever-drag model drag devices provided encompassing the spool shaft, the anti-reverse mechanism is provided on the spool shaft or the drag disk(s).

Ratchet-type anti-reverse mechanisms are generally employed in the type of anti-reverse mechanisms used in lever-drag reel braking devices. Ratchet-type anti-reverse mechanisms have a rotary member fitted non-rotatably to the link member, and on the outer periphery of which circumferentially spaced teeth are formed; pawls fitted on the reel body pivotally between a contact posture in which they contact, and a separated posture in which they are parted away from, the teeth on the rotary member; and urging members that urge the pawls toward the contact posture. The pawls are disposed with the leading ends downstream from the pivot centers in the line take-up direction.

With thus configured ratchet-type anti-reverse mechanisms, when the rotary member rotates in the line take-up direction cooperatively with spool rotation in the line take-up direction, the pawls are pressed toward the separated posture by the teeth. If the teeth pass beyond the pawls, however, they are urged toward the contact posture by the urging member, and come into contact with the rotary member. For this reason, when the spool rotates in the line take-up direction, the pawls in the swung state contact the rotary member and produce an intermittent clicking sound. This sort of clicking sound being produced becomes unpleasant when jigging or like angling in which the wind-in operation is repeated frequently and the noise is continual. Moreover, because the pawls contact the rotary member, the rotational resistance during wind-in increases, and the wind-in efficiency degrades.

Therein, to get rid of the clicking sound during line take-up, instead of urging by means of a spring, mechanisms furnished with urging members that by friction urge the pawls are known. The urging members are constituted by a thin plate element bent into a C-shape, and are fixedly fitted onto the pawls. The tips of the pair of urging members grasp the rotary member by elastic contact on either lateral surface of the rotary member. In anti-reverse mechanisms furnished with this sort of friction-based urging member, when the rotary member rotates in the line take-up direction, the pawls are urged under friction toward the separated posture, and when it rotates in the line reel-out direction, urged under friction toward the separated posture. The clicking sound is therefore not produced during line take-up.

With the foregoing anti-reverse mechanisms, in disassembling for maintenance, parts replacement, or the like, when the link member for the handle shaft, spool shaft, etc. is taken out, the rotary member can happen to move together with the link member. It the rotary member shifts together with the link member, there is a chance the urging members grasping the rotary member will deform. To prevent this the rotary member should be disposed to allow it to travel axially relative to the link member.

Though the rotary member is disposed this way to allow it to travel, due to the influence of lubricant such as grease and the effect of friction, there is a chance that the rotary member will be shifted, even if slightly, by the movement of the link member. Even shifting slightly like this still risks that the urging members, constituted by a comparatively thin plate element, will deform.

Frictional force will not be produced between the urging members and the rotary member if the urging members deform, which means that the pawls cannot be urged normally. Consequently, the anti-reverse mechanism will not function normally.

SUMMARY OF THE INVENTION

An object of the present invention is in an anti-reverse mechanism furnished with urging members that under friction with the rotary member urge the pawls, to keep the urging members from deforming when the link member is removed/attached.

A dual-bearing reel anti-reverse mechanism according to a first aspect of the invention the is a mechanism for governing rotation of the dual-bearing reel spool, rotatively fitted in the reel body, in the line reeling-out direction, and is furnished with a rotary member, a pawl member, anchoring means, and urging means. A circumferentially spaced plurality of teeth is formed on the outer periphery of rotary member, which is fitted non-rotatably yet free to shift axially onto a link member for linking with the spool. The pawl member is mounted on the reel body to allow its leading end to pivot between a contact posture in which the leading end contacts, and a separated posture in which it is parted away from, the teeth. The pawl member is mounted such that when the leading end is disposed in the contact posture, it prohibits rotation of the rotary member in the line reel-out direction. The anchoring means is an expedient provided on the reel body to anchor the rotary member against the reel body. The urging means is fitted to the pawl member and urges the pawl member toward the separated posture when the rotary member is rotated in the line wind-in direction. When the rotary member is rotated in the line reel-out direction, the urging means urges the rotary member toward the contact posture.

When the spool rotates in the line take-up direction by likewise rotation of the handle, the rotary member also rotates in the line take-up direction. In this anti-reverse mechanism thus directed rotation causes the urging means to urge the pawl toward the separated posture. The pawl thereby no longer strikes on the rotary member, keeping sound from being produced. Further, when the spool rotates in the line reel-out direction and the rotary member is about to rotate likewise, the urging means urges the pawl to member toward the contact position. This prohibits rotation of the rotary member in the line reel-out direction, so that the drag is operational. To carry out maintenance or other work on the anti-reverse mechanism will be taken apart. In the anti-reverse mechanism configured as above, however, the rotary member is fitted free to shift axially onto the link member but at the same time is anchored to the reel body by the anchoring means. Therefore during removal/attachment the rotary member stays in the reel body and does not shift axially. Accordingly, the urging member fitted to the pawl member is not liable to deform when the link member is removed/attached.

A dual-bearing reel anti-reverse mechanism according to a second aspect of the invention is the urging means in the mechanism in the foregoing first aspect, being provided on the pawl member and having a grasping member that resiliently grasps either lateral face of the rotary member. Herein, the grasping member though resiliently grasping either lateral face of the rotary member is unlikely to deform when the linking member is removed/attached. Moreover, since either lateral face of the rotary member is grasped and urged, the reliability of the urging function is improved.

A dual-bearing reel anti-reverse mechanism according to a third aspect of the invention is the anchoring means in the mechanism in the foregoing first or second aspects, anchoring the pawl member against the reel body. Herein since the pawl member is in addition to the rotary member anchored, the pivotal support structure for the pawl on the reel body is simplified.

A dual-bearing reel anti-reverse mechanism according to a fourth aspect is, in the mechanism set forth in any of the first through third aspects, further furnished with alignment means enabling the rotary member to align with respect to the reel body so as to match the rotational axis of the rotary member and the rotational axis of the link member. Herein the rotary member is aligned when fitted to the reel body, which makes it easier to put in the rotary member during assembly.

A dual-bearing reel anti-reverse mechanism according to a fifth aspect is the anchoring means in the mechanism in any of the foregoing first through fourth aspects, being a plate-shaped member fixed to the reel body, and disposed with one end in a position opposing the lateral face of said rotary member that is reverse to the reel body. Herein, the anchoring means is constituted by a plate-shaped component, and therefore the constitution of the anchoring means is simple.

A dual-bearing reel anti-reverse mechanism according to a sixth aspect is the link member in the mechanism in any of the foregoing first through fifth aspects, being the spool shaft rotatively supporting the spool. Herein—in an anti-reverse mechanism employed in a lever-drag type drag mechanism—deformation of the urging member is prevented.

A dual-bearing reel anti-reverse mechanism according to a seventh aspect of the invention is the link member in the mechanism in any of the foregoing first through seventh aspects, being the shaft for the spool-cranking handle. Herein—in an anti-reverse mechanism employed in star-drag type drag mechanism—deformation of the urging member is prevented.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration

Figure 1:
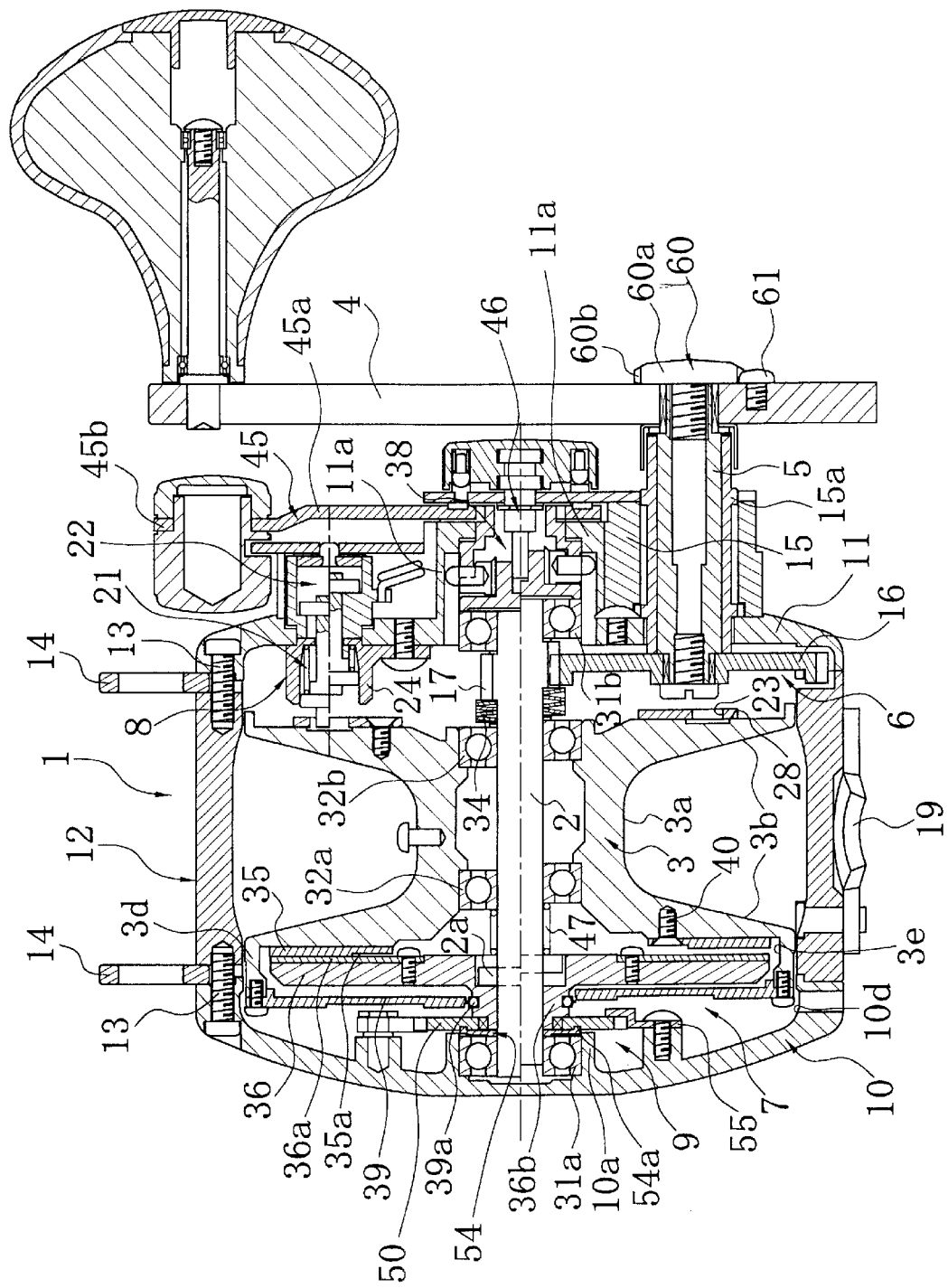
FIG. 1 is a sectional view of a lever-drag reel in one embodiment of the present invention.

In FIG. 1, a dual-bearing reel in which an embodiment of the present invention is adapted, is a lever-drag reel furnished with a cylindrical reel unit 1, a spool shaft 2 mounted rotatively in the central part of the reel unit 1, a spool 3 rotatively but axially immovably supported on the spool shaft 2, and a handle 4 disposed laterally on the reel unit 1. In the reel unit 1 interior, the lever drag reel is provided with a rotation transmission mechanism 6 for transmitting to the spool 3 rotation of the handle 4, a lever drag mechanism 7 for braking rotation of the spool 3 in its line reeling-out direction, a spool-locking mechanism 8 for locking the spool 3, and an anti-reverse mechanism 9 for restraining rotation of the lever drag mechanism 7 in the reeling-out direction.

Reel Body Configuration

The reel unit 1 has: a left/right pair of plate-shaped side plates 10, 11 made of metal; and a perforated cylindrical reel body 12, made of metal, to either end of which the side plates 10, 11 are joined coaxially by spigot joints and fastened by a plurality of fastening bolts 13. Harness lugs 14 of a pair, used for supporting the reel with the body, are mounted in between the side plates 10, 11 and the reel body 12. The approximately central portions of the side plates 10, 11 rotatively support either end of the spool shaft 2. A cylindrical bearing accommodating portion 10a that protrudes inward is formed in the central portion of the inside face of the left side plate 10. Also, a finishing process that takes away bulk is carried out on the inner margin 10d of the spigot joint section of the left side plate 10, by undercutting the inner margin in a way that avoids the fastening bolts 13. This serves to make the reel unit 1 lightweight. A boss 11a protruding axially outward is formed in the central portion of the right side plate 11 (handle 4 side) for supporting the spool shaft 2; and on the periphery of the boss 11a, a thick-walled, disk-shaped bearing block 15 for mounting the handle shaft 5 of the handle 4 is screwed fast. The under portion of the reel body 12 is provided with a rod attachment part 19 for mounting the reel onto a fishing rod.

By a pair of left and right bearings 31a, 31b disposed at either end, the spool shaft 2 is rotatively supported in the side plates 10 and 11 on the reel unit 1. Also, spaced axially inward thereof are two bearings 32a, 32b disposed at either end of the spool 3, by which the spool 3 is rotatively supported. The bearing 31a on the left side is accommodated by the bearing accommodating portion 10a formed on the left side plate 10. The bearing 31b on the right side is mounted in the boss 11a formed on the right side plate 11. The components of a drag shifting mechanism 38 (described later) for the lever drag mechanism 7 adjoins the right side of the bearing 31b outer race on the right end of the spool shaft 2. Additionally, a pinion gear 17 (described later) for the rotation transmission mechanism 6 adjoins the left side of the bearing 31b inner race. The anti-reverse mechanism 9 adjoins the right side of the bearing 31a inner race on the left end of the spool shaft 2. Further, the inside face of the side plate 10 abuts the left end of the outer race. The spool 3 abuts on the left side of the outer race of the right-side bearing 32b that supports the spool 3. Further, four disk springs 34 abut on the right side of the inner race via a washer (not shown). The disk springs 34 are provided in order to make the drag force adjustable over a broad range with respect to pivot of the brake operating lever (described below), without the drag force elevating abruptly. A later described friction disk 36 in the lever drag mechanism 7 via a return spring 47 abuts on the left side of the inner race of the left bearing 32*a* that supports the spool 3. The right side of the outer race abuts on the spool 3.

The spool 3 has a bobbin trunk 3*a*, and flanges 3*b* that are formed integrally with the bobbin trunk 3*a* on either end. The spool-locking mechanism 8 is provided outward of the flange 3*b* on the right side (handle-mounting side) in FIG. 1. Further, a brake disk 35 for the lever drag mechanism 7 is mounted outward of the flange 3*b* on the left side in FIG. 1. The outer periphery of the left flange 3*b* is formed into a cylindrical portion 3*d* extending outward in the spool shaft direction, for attaching a cover 39 for covering the brake disk 35. The inner peripheral surface 3*e* of the cylindrical part 3*d* is finished by undercutting to take away bulk. This serves to make the spool 3 lightweight and reduces the inertia of the spool 3.

Spool-Locking Mechanism Configuration

Figure 2:
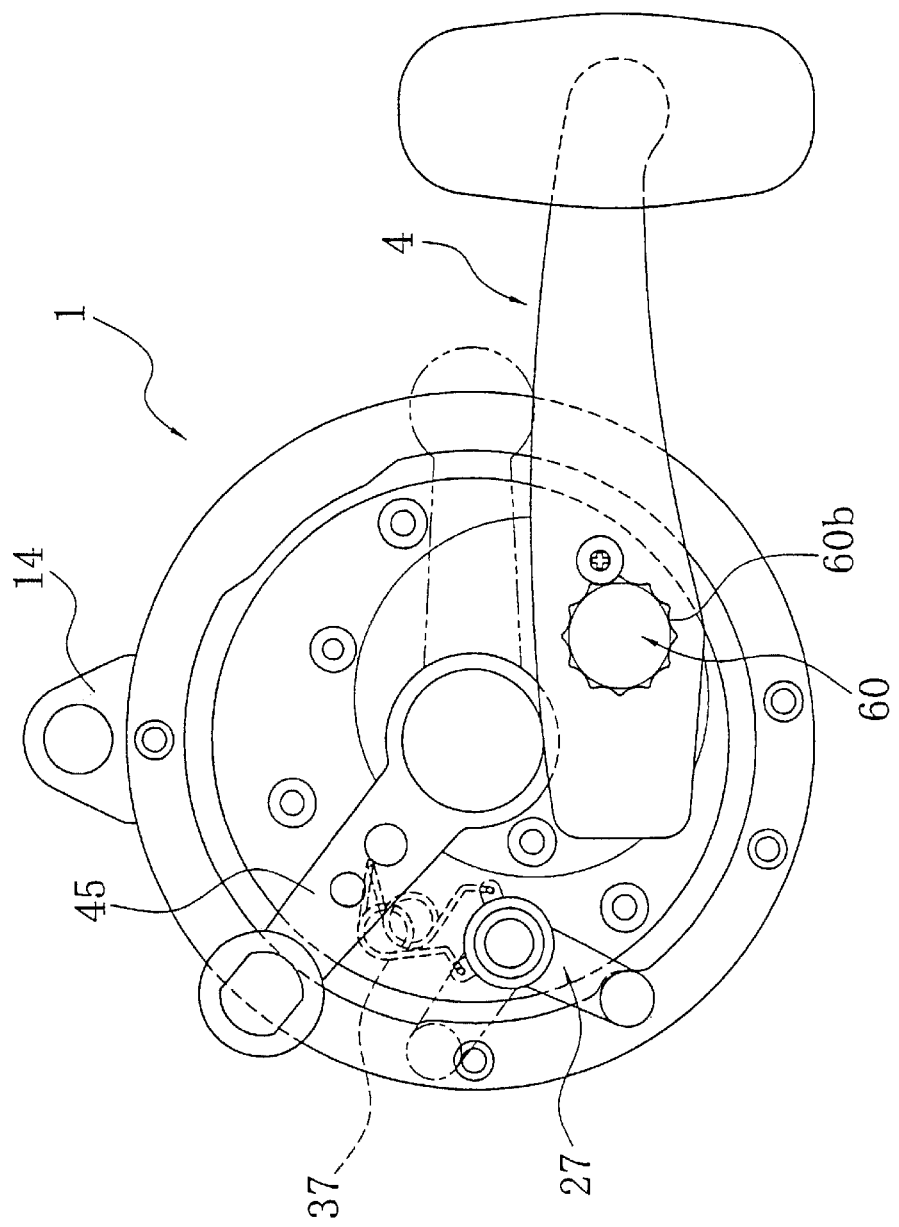
FIG. 2 is a lateral view of the FIG. 1 lever-drag reel.
Figure 3:
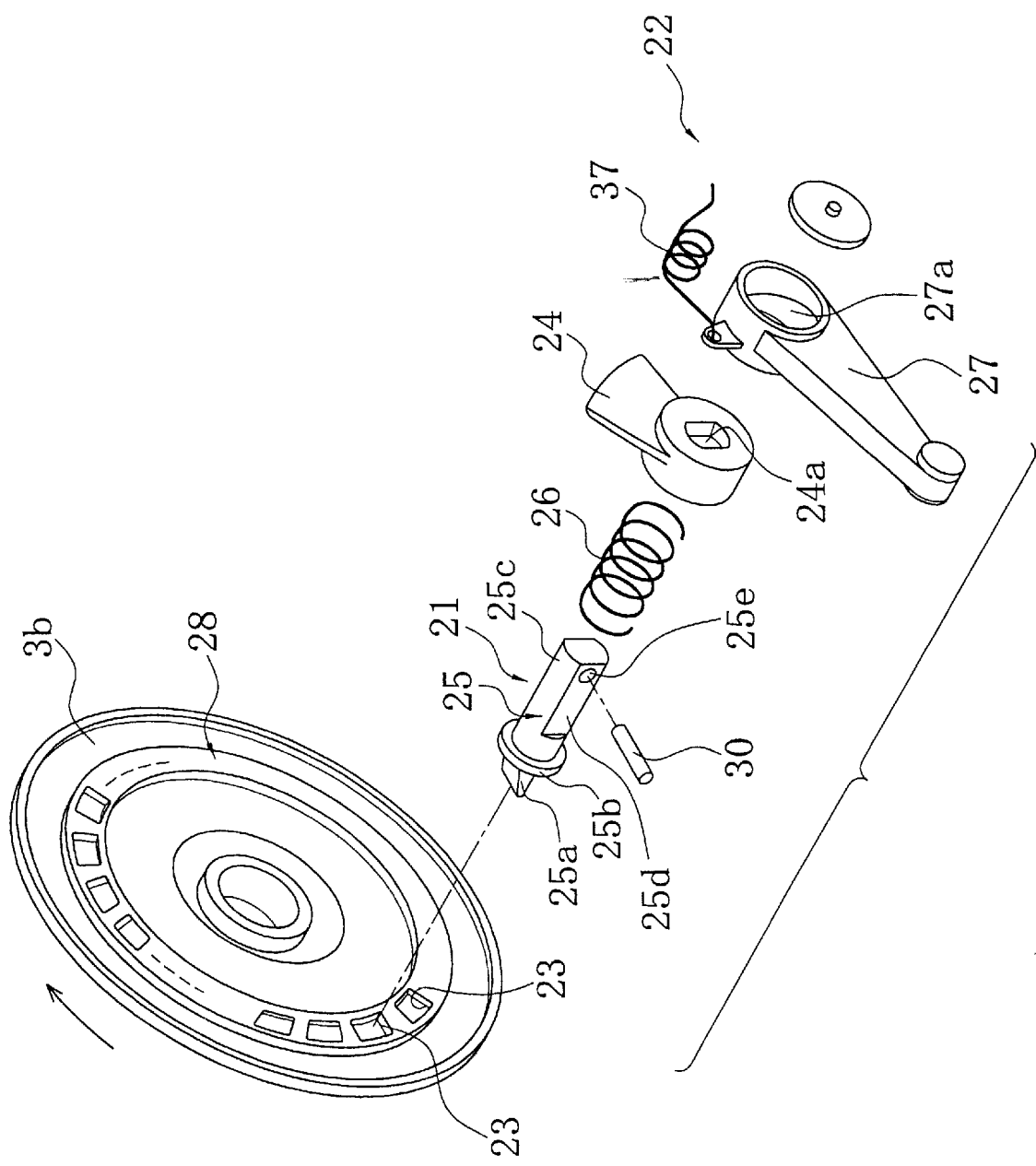
FIG. 3 is an exploded oblique view of a spool-locking mechanism from the FIG. 1 reel.
Figure 4A:
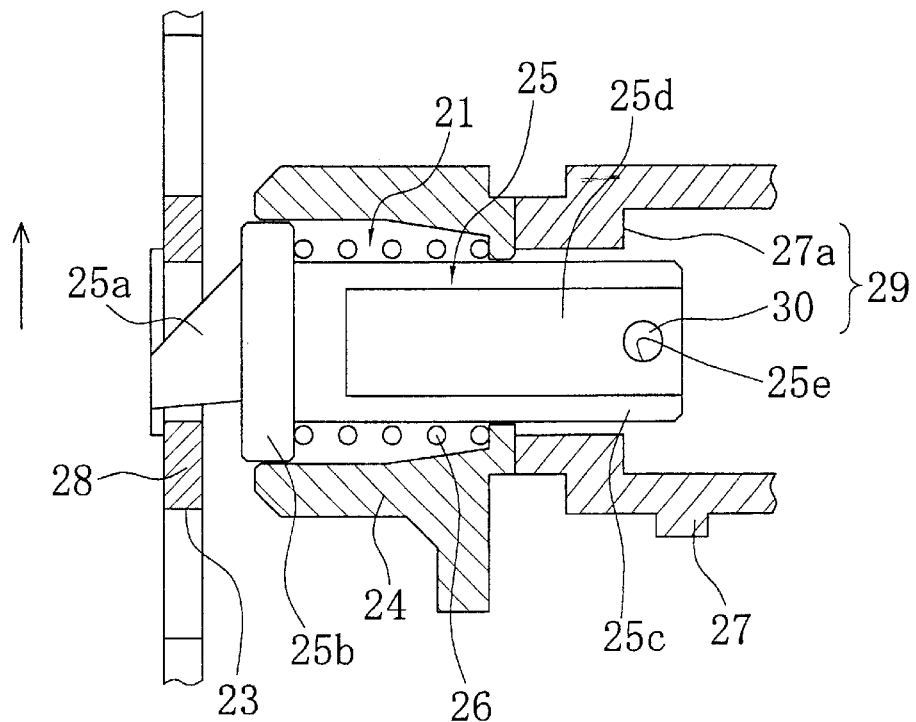
FIG. 4A and 4B are enlarged fragmentary sectional views of the spool-locking mechanism.
Figure 4B:
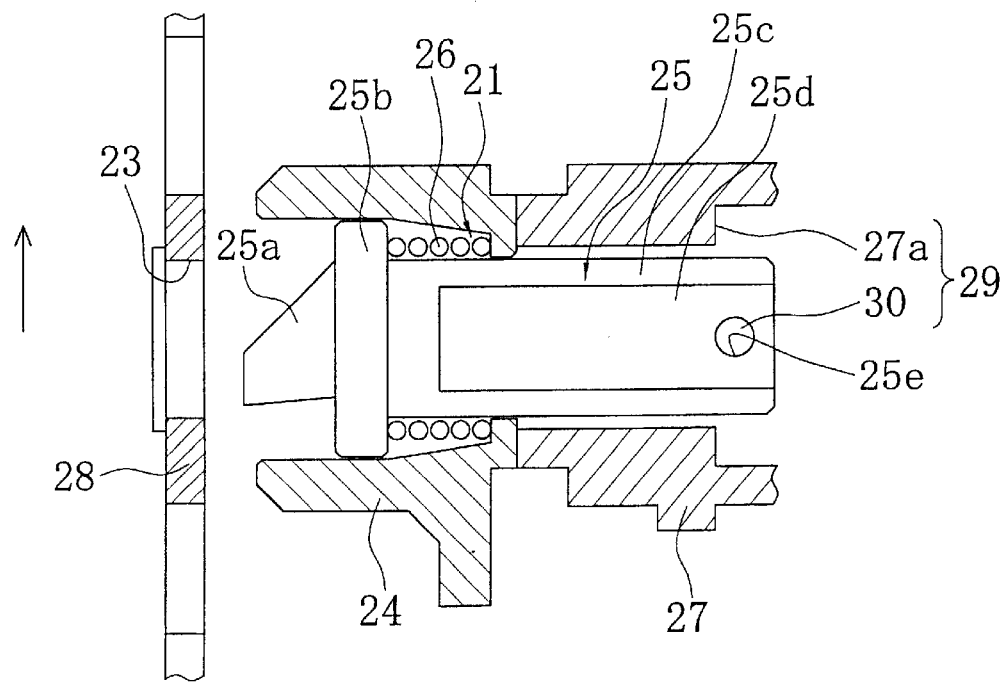

The spool-locking mechanism 8 permits rotation of the spool 3 in the line wind-in direction, and locks it from rotating in the line reeling-out direction, and as shown in FIG. 2, is disposed neighboring the rear of the reel unit 1. The spool-locking mechanism 8, as shown in FIG. 3 and 4, is provided with a locking piece 21 mounted on the reel unit 1 allowing it to shift between an advanced position (FIG. 4A) and aretracted position (FIG. 4B); a lock shifting mechanism 22 that shifts the locking piece 21 between the advanced position and the retracted position; and locking recesses 23, provided on the outside surface of a flange 3*b*, and into which the tip of the locking piece 21 is engageable when advanced into the advanced position.

The locking piece 21 has a shifting member 25 fitted, in an accommodating member 24 fixed to the side plate 11, to allow it to shift along an axis parallel to the spool shaft 2. The shifting member 25, which is a rod-shaped, has, from the leading-end side, a locking protrusion 25*a*, a brim 25*b*, a shaft 25*c*, and chamfered portions 25*d*. The upstream side in the line reel-out direction (indicated by the arrow in FIG. 4) of the locking protrusion 25*a*, which is a protrusion for engagement with the locking recesses 23, is formed at an acute angle, and the downstream side at an a obtuse angle. While the thus formed locking protrusion 25*a* is interlocked with a locking recess 23, when the locking recess 23 comes into contact with the acute-angled side, the shifting member 25, even if somewhat tilted, will securely bite into the locking recess 23 and lock the spool 3; and when the locking recess 23 comes into contact with the obtuse-angled side, the shifting member 25 will be retractable by action of the locking recess 23. The brim 25*b* is for interlocking with a coil spring 26 that is component of the lock shifting mechanism 22. The coil spring 26 is disposed inside the accommodating member 24 around the shaft 25*c* of the shifting member 25. The coil spring 26 urges the shifting member 25 toward the locking recesses 23. The shaft 25*c* is supported permitting it to shift axially in the accommodating member 24. The shaft 25*c* is also non-rotatably interlocked with the accommodating member 24 by the chamfered portions 25*d*. That is, a rounded notch 24*a* into which the chamfered portions 25*d* can interlock is formed in one end of the accommodating member 24. Thus, the shifting member 25 is mounted to the reel unit 1 non-rotatably yet allowed to shift axially. A radially extending through-hole 25*e* is formed in the shifting member 25 at the rear end of the chamfered portions 25*d*. A cam pin 30 that is a component of the lock shifting mechanism 22 is fitted in the through-hole 25*e*. The cam pin 30 also acts as a locator for the shifting member 25 on the advanced-position end. By means of the locking protrusion 25*a* conformed as noted above, and the pressing force due to the coil spring 26, when the shifting member 25 shifted into the advanced position engages a locking recess 23, rotation in the line reel-in direction is permitted and rotation in the line reel-out direction is locked.

The locking recesses 23 are constituted by cutouts, circumferentially spaced along the rotational direction, in a lock plate 28. The lock plate 28 is a ring-shaped plate that is fastened to the outer surface of the right flange 3*b* on the spool 3 in FIG. 1. In the outer surface of the spool 3 flange portion 3*b* where the locking recesses 23 are formed, an annular recessed escape portion 3*c* is formed opposing the locking recesses 23. Forming the escape portion 3*c* in this fashion lets the locking protrusion 25*a* of the shifting member 25 penetrate the locking recess 23.

The lock shifting mechanism 22 includes a locking lever 27 mounted to the side plate 11 for pivoting around the shifting member 25 shaft, the coil spring 26 mentioned above, and a locking cam mechanism 29, which in response to pivoting by the locking lever 27 shifts the shifting member 25 from the advanced position into the retracted position against the spring force of the coil spring 26. As shown in FIG. 2, the locking lever 27 is urged by a toggle spring 37 into an advancing posture, indicated by phantom lines and corresponding to the advanced position, and a retracting posture, indicated by solid lines and corresponding to the retracted position. The locking cam mechanism 29 includes a slanted cam surface 27*a* formed helically on the base-end inner wall surface of the locking lever 27, and the cam pin 30 mounted to the rear end of the shifting member 25 so as to engage the slanted cam surface 27*a*.

As shown in FIG. 1 and 2, below the spool shaft 2 the handle 4 is fastened by a fastening bolt 60 to the protruding end of the cylindrical handle shaft 5, which runs parallel to the spool shaft 2. A brim 60*a* is formed on the fastening bolt 60. Twelve circumferentially spaced arcuate recesses 60*b* are formed on the brim 60*a*, and is locked in place by a screw 61, the head of which engages a recess 60*b*. The handle shaft 5 is rotatively mounted in a cylindrical member 15*a* inserted into the bearing block 15 frontward below the boss portion 11*a*. A main gear 16 is mounted non-rotatably to the tip of the handle shaft 5.

As shown in FIG. 1, the rotation transmission mechanism 6 includes the main gear 16, which is supported rotatively by the handle shaft 5 for the handle 4; and the pinion gear 17, which is formed unitarily with the spool shaft 2. Rotation from the handle 4 is transmitted to the spool shaft 2 via the handle shaft 5, the main gear 16, and the pinion gear 17.

As shown in FIG. 1, the lever drag mechanism 7 includes the brake disk 35, which is mounted on the outside face of the FIG. 1 left-side flange 3*b* on the spool 3; the friction disk 36, which is disposed for contacting the brake disk 35; and the drag shifting mechanism 38, which is for reciprocatingly shifting the spool 3 and the friction disk 36 in the spool axial direction.

The brake disk 35 is for example a washer-shaped disk member made of stainless steel, and is mounted non-rotatably with respect to the spool 3 on the outside face of the left-side flange 3*b* on the spool 3 by means of a radially inward, circumferentially spaced plurality of attaching screws 40 disposed on the lateral surface. An attaching portion 35*a* for attaching the screws 40 on the brake disk 35 is annularly depressed below the radial outward portion. This keeps the drag area, in particular the radially outward drag area, from being restricted, which makes the maximum diameter of the brake disk 35 corresponding to the outer diameter of the spool 3 usable.

The friction disk 36 is disposed opposing the brake disk 35. A ring-shaped friction plate 36a made of abrasion-resistant material, for example carbon graphite or fiber-reinforced resin, is fastened to the surface of the friction disk 36 that opposes the brake disk 35, by an appropriate fastening means, such as screws. In the central portion of the friction disk 36 is a tubular boss portion 36b that protrudes axially outward; and a pin 2a, which is fitted into the spool shaft 2, penetrating through the spool shaft 2 diametrically, interlocks with the boss portion 36b. Accordingly, the friction disk 36 is mounted on the spool shaft 2 non-rotatably and rotates together with the spool shaft 2. Further, a ratchet wheel 50 in the anti-reverse mechanism 9 is fitted, non-rotatably yet free to shift axially, to the FIG. 1 left-end surface of the boss portion 36b on the friction disk 36. Additionally, a cover member 39 covers the friction disk 36 The boss portion 36b on the friction disk 36 passes through the cover member 39 and extends toward the bearing 31a. A sealing member 39a is interposed between the penetrated part of the cover member 39 and the boss portion 36b.

Anti-Reverse Mechanism Configuration

Figure 5:
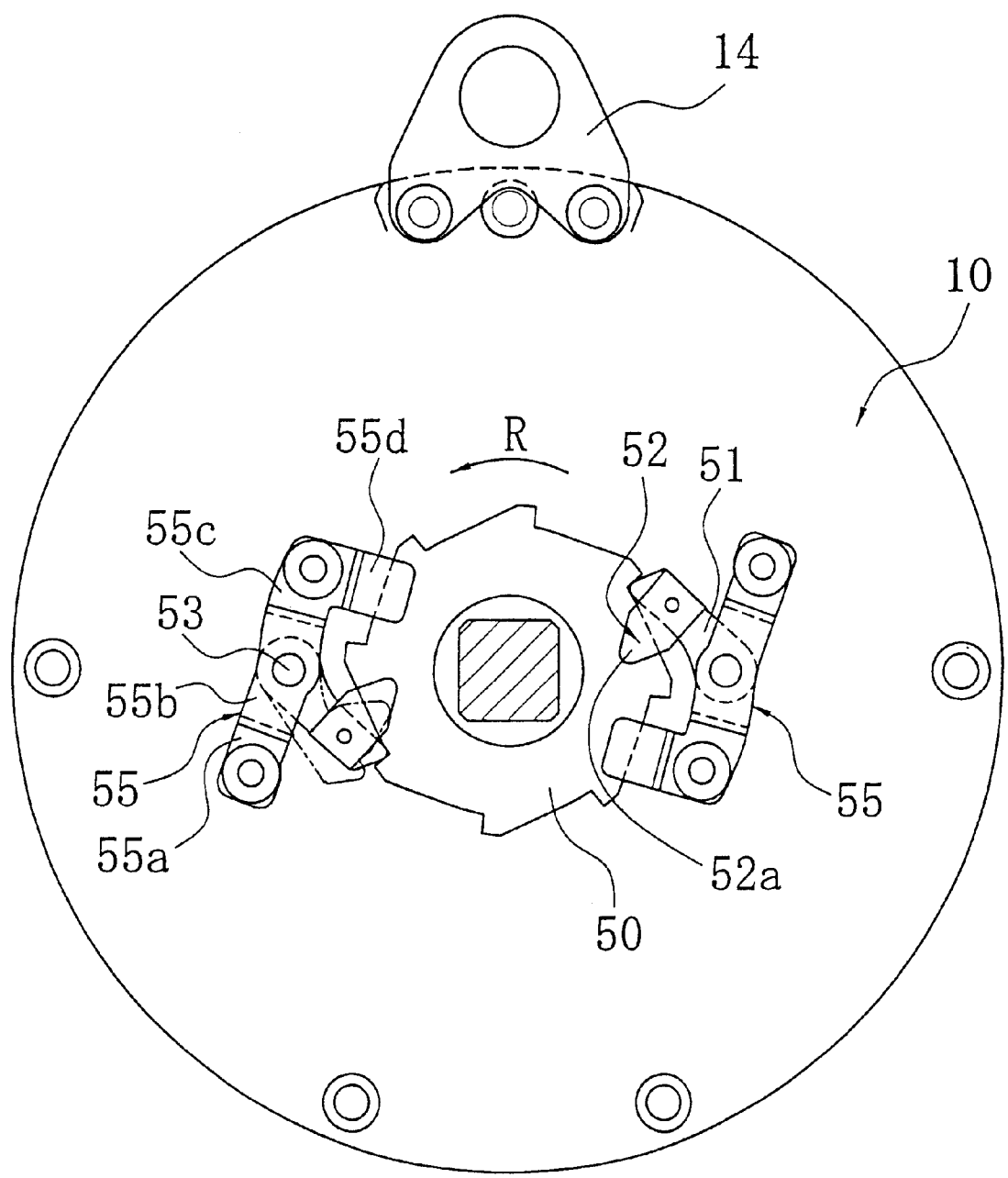
FIG. 5 is an enlarged elevational view of an anti-reverse mechanism from the FIG. 1 reel.
Figure 6:
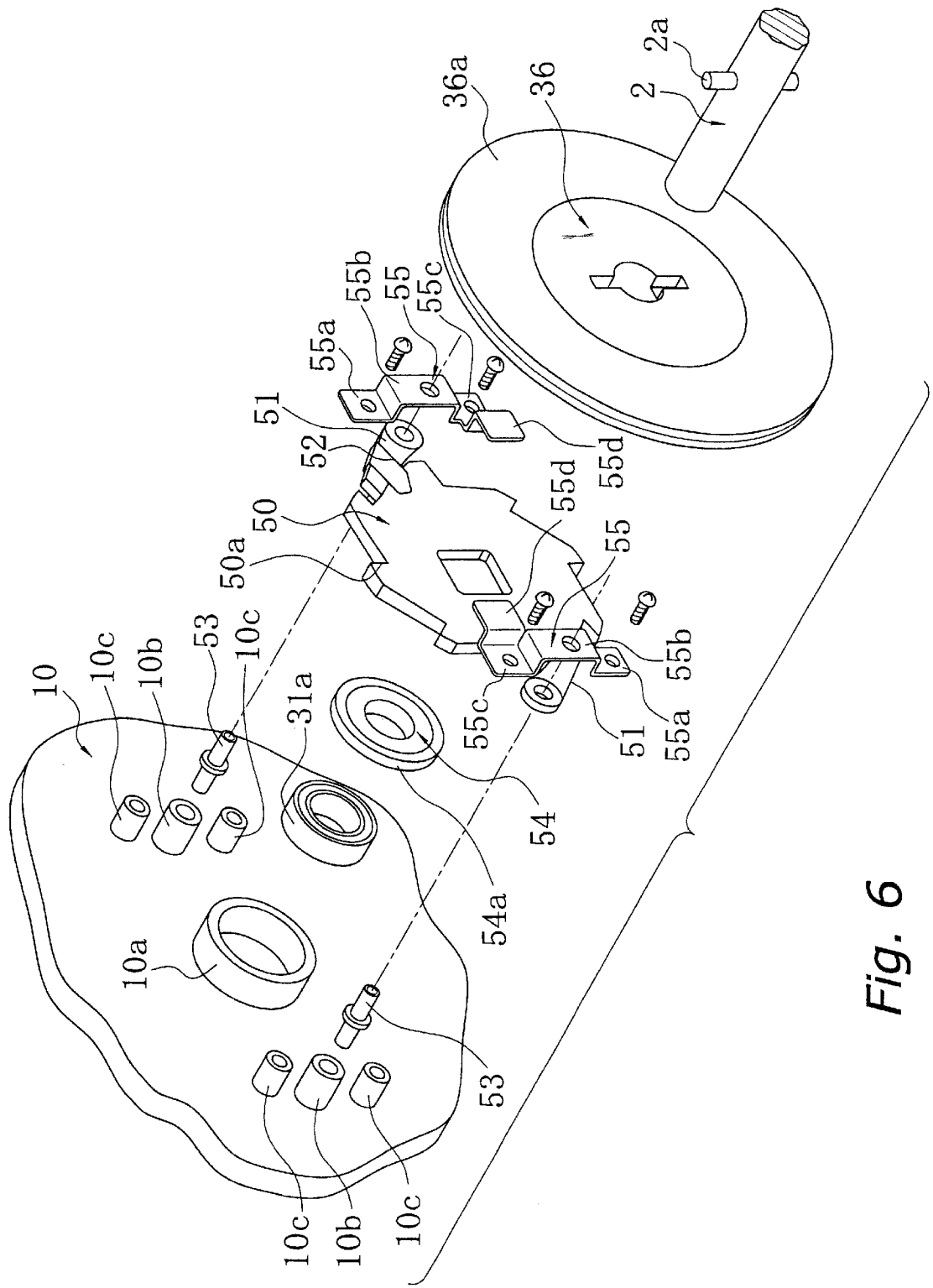
FIG. 6 is an exploded oblique view of the anti-reverse mechanism.

As shown in FIG. 5 and 6, the anti-reverse mechanism 9 is a ratchet-type one-way clutch that includes a ratchet wheel 50 (one example of a rotary member) on the circumferential surface of which saw-teeth 50a are formed; and a pair of ratchet pawls 51 (one example of ratchet members) whose tips interlock with the saw teeth 50a, and which are disposed on the outer peripheral side of the ratchet wheel 50.

The ratchet wheel 50 is mounted non-rotatably yet free to shift axially outward (to the left in FIG. 1) by a suitable interlocking means, for example by serrations, to the outer peripheral surface of the boss portion 36b on the friction disk 36. Consequently the ratchet wheel 50 is mounted via the friction disk 36 to the spool shaft 2 (one example of a link member), non-rotatably yet free to shift axially. The ratchet wheel 50 has a ring-shaped abutting member 54 coaxially fitted to its FIG. 1 left-side face. The abutting member 54 abuts on the right-side end face of the bearing 31a inner race, and on its outer peripheral surface is an alignment portion 54a disposed adjacent the inner peripheral surface of the bearing accommodating portion 10a. Thus providing the abutting member 54 makes the ratchet wheel 50 mountable centered with respect to the side plate 10, facilitating assembly of the ratchet wheel 50. Now, the outer race of the bearing 31a adjoins the side plate 10, as noted earlier.

The ratchet wheel 50 is anchored to the side plate 10 by a pair of braces 55. The braces 55 are plate-like members made of metal, for example a stainless steel alloy, with the one ends 55a fastened to the side plate 10. The braces 55 are formed into central portions 55b, bent from the first end portions 55a out toward the friction disk 36 into a crank-shape spanning the ratchet pawls 51, and are formed into fastening portions 55c, bent in toward the side plate 10a into a crank-shape. The fastening portions 55c are also fastened to the side plate 10. Further, the other ends 55d are formed bent into a crank-shape crooking from the fastening portions 55c toward the ratchet wheel. The other ends 55d are disposed in a position opposing the ratchet wheel 50 lateral surface on the friction disk 36 side. The ratchet wheel 50 is anchored by these other ends 55d. Also, the ratchet pawls 51 are anchored, and their axial travel restrained, by the central portions 55b.

The pair of ratchet pawls 51 is disposed in positions that are point symmetrical with respect to the spool shaft axis, and is mounted to the inside surface of the side plate 10 free to pivot between a contact posture, in which they are in contact with the saw-teeth 50a, and a separated posture, in which they are separated from the saw teeth 50a. The tips of the ratchet pawls 51 are disposed downstream from the pivotal axes in the line take-up direction R of the ratchet wheel 50. A pair of pawl bosses 10b, for pivotally mounting the ratchet pawls 51, is formed on the side plate 10 in symmetrical positions astride the bearing accommodating member 10a. Further, two attachment bosses 10c are formed astride the pawl bosses 10b of the pair. Pivot pins 53 for mounting the ratchet pawls 51 pivotally to the side plate 10 are fitted into the pawl bosses 10b. Also, the pivot pins 53 are anchored by the braces 55, which restrains their axial travel. The two attachment bosses 10c are provided for fastening the braces 55 by screwing fast the one ends 55a and the fastening portions 55c to the side plate 10.

A grasping member (one example of an urging means) 52, which is bent over into a C-shape, is fitted on and fastened to the central portion of the ratchet pawls 51. A pair of tips 52a on the grasping member 52 grasps the ratchet wheel 50 by resiliently contacting either lateral face of the ratchet wheel 50. When the ratchet wheel 50 rotates in the line take-up direction R, the grasping members 52 urge the ratchet pawls 51 into the separated posture under friction with the ratchet wheel 50. The urged ratchet pawls 51 come into contact with the braces 55 and are retained in the separated position. Again, rotating the ratchet wheel 50 reverse to the line reel-out direction urges the ratchet pawls 51 into the contact posture under friction with the ratchet wheel 50. Accordingly, when line is wound in the ratchet pawls 51 no longer contact the saw teeth 50a on the ratchet wheel 50, which suppresses noise. This furthermore curbs increase in rotational resistance, and curbs degradation in the reeling-in efficiency of the spool 3 as well.

As a result, the friction disk 36 cannot shift in the axially outward direction of the spool shaft (leftward in FIG. 1), i.e., in the direction parting away from the brake disk 35; and meanwhile it is permitted by the anti-reverse mechanism 9 to rotate in the line take-up direction but prohibited from rotating in the line reel-out direction.

Herein, in the brake-released state as shown beneath the spool-shaft axis in FIG. 1, a gap opens between the friction plate 36a on the friction disk 36, and the brake disk 35; and in the braked state as shown above the spool-shaft axis in FIG. 1, the two adhere. The drag force is changed by adjusting the degree of adherence.

As shown in FIG. 1, the drag shifting mechanism 38 includes a brake handling lever 45 provided pivotally on the reel unit 1; a pressing mechanism 46, which, in response to pivoting the brake handling lever 45 clockwise in FIG. 2, presses against the spool 3 and the brake disk 35 and shifts them leftward in FIG. 1; and a return spring 47, which is disposed between the friction disk 36 and the spool 3, and shifts the spool rightward in FIG. 1 in response to the brake handling lever 45 moving counterclockwise in FIG. 2.

The return spring 47 is fitted circumferentially about the spool shaft 2, in the compressed state in between the friction disk 36 and the bearing 32; and the friction disk 36 urges the brake disk 35 (the spool 3) into the separated direction, urging the brake disk 35 (the spool 3) rightward in FIG. 1.

The brake handling lever 45 is mounted to the reel unit 1 free to pivot between the brake release position, as shown by the solid line in FIG. 2, and the maximum braking position, indicated by phantom lines. The brake handling lever 45 includes a lever portion 45a that is pivotally mounted to the boss portion 11a, and a knob portion 45b that is fastened to the tip end of the lever portion 45a. The base end of the lever portion 45a interlocks non-rotatably with the pressing mechanism 46.

The following explains the braking function of the lever drag mechanism 7.

In the lever drag mechanism 7, when the brake handling lever 45 is pivoted from the braking position, indicated by phantom lines in FIG. 2, into the brake release position, indicated by solid lines, the state shown above the spool axis in FIG. 1 is switched into the state shown beneath the spool axis. Initially the spool 3 is pressed by the urging force of the return spring 47 and shifted rightward in FIG. 1. A gap thereby opens between the brake disk 35 and the friction disk 36. The spool 3 is further pressed via the bearing 32a and shifted rightward. This releases the braking on the spool 3. Meanwhile when the spool 3 shifts, the pressing mechanism 46 is pressed via the bearing 32b, the disk springs 34, the pinion gear 17, and the bearing 31b, and retreats rightward in FIG. 1. Then, when the brake handling lever 45 is pivoted into the brake release position, there is a shift into the state below the spool-shaft axis in FIG. 1.

On the other hand, when the brake handling lever 45 is pivoted from the brake release position indicated by solid lines in FIG. 2, into the braking position indicated by phantom lines, the state shown on the lower side of the spool axis in FIG. 1 is switched into the state shown on the upper side. Initially, by pivoting the brake handling lever 45 the pressing mechanism 46 is shifted leftward in the spool axial direction. This presses on and shifts the outer race of the bearing 31b, and the spool 3 is pressed via the pinion gear 17, the disk springs 34, and the bearing 32b and shifted leftward in the spool axial direction (leftward in FIG. 1). Consequently the brake disk 35 also shifts leftward axially. As a result, the brake disk 35 nears the friction disk 36. Then, when the brake disk 35 comes into contact with the friction disk 36, which is axially immovable and non-rotatable in the line reel-out direction, drag force acts on the spool 3. When the brake handling lever 45 is then pivoted to the maximum pivotal position, pressing force is maximized and the friction disk 36 pressing on the brake disk 35 yields large drag force.

In this state, when the spool 3 rotates in the line wind-in direction through rotation of the handle 4, via the friction disk 36 the ratchet wheel 50 is also rotated in the line wind-in direction R (FIG. 5). This tugs the graspers 52, under friction with the ratchet wheel 50, in the line wind-in direction R. Consequently the ratchet pawls 51 are urged toward the separated posture by the graspers 52, and pivot into the separated posture to abut against the braces 55. Therefore, when the spool 3 rotates in the line wind-in direction, there is no clicking sound produced due to collision between the ratchet wheel 50 and the ratchet pawls 51.

Meanwhile, when a fish is caught on the tackle and the spool 3 spins in the line reel-out direction, the ratchet wheel 50 also rotates in the line reeling-out direction. When this happens, the graspers 52 under friction with the ratchet wheel 50 are yanked in the line reeling-out direction, reverse to the line reeling-in direction R. Consequently, the ratchet pawls 51 are urged into the contact posture by the graspers 52 and pivot into the contact posture. For this reason, when the spool 3 is rotated in the line reeling-out direction, the ratchet wheel 50 is prohibited from rotating in the line reeling-out direction. Consequently the friction disk 36 is stopped from rotating in the line reeling-out direction, and the set drag force is applied to the spool 3.

The following explains how the lever drag reel is operated.

When winding fishing line onto the spool, the handle 4 is rotated in the line take-up direction. Doing so transmits the handle 4 rotation to the spool 3 via the handle shaft 5, the main gear 16, the pinion gear 17, the spool shaft 2, and the lever drag mechanism 7, rotating the spool 3.

Meanwhile, in the event that the spool 3 locks if the tackle is snagged, the locking lever 27 is pivoted from the position indicated by solid lines in FIG. 2 into the position indicated by phantom lines. This causes the shifting member 25 urged by the coil spring 26 to advance into the advanced position, interlocking the locking protrusion 25a with a locking recess 23, and locking the spool 3 against rotation in the line reeling-out direction. In this state, after the line is reeled to take up line slack, the fishing rod is pointed toward the tackle and tugged directly back. Doing this breaks the snag, or the snagged fishing hook(s), fishing line or tangle therein, so that the terminal tackle or a portion of the tackle may be recovered.

Herein the shifting member 25 undergoes force by the brim 25b and the shaft 25c coming into contact with the accommodating member 24. In this locking, the spool 3 is locked by engagement of the shifting member 25 with a locking recess 23 provided on the spool 3, which means that the spool 3 is locked directly and that the spool-locking mechanism 8 is less likely to damaged or deformed, even if acted upon by abnormal force. Furthermore, providing the locking recesses 23 on the outside face of the flange 3b disposes the locking recesses 23 in a section that is equal to or greater than the normal winding diameter of the fishing line when the fishing line is being reeled out. For this reason, the force acting on the shifting member 25 is equal to or less than the tension on the fishing line. This makes it even more unlikely that the spool-locking mechanism 8 will be broken or deformed.

Because, as described above, the locking protrusion 25a is obtuse-angled on its downstream side on the line reeling-out direction, and because the shifting member 25 is urged by the coil spring 26, when the spool 3 rotates in the line take-up direction the shifting member 25 is pressed by the locking recesses 23 and shifts into the retracted position. Thus, even if the spool 3 is mistakenly rotated in the line take-up direction while the spool is locked, abnormal force does not act on the rotation transmission mechanism 6.

On the other hand, when the spool shaft 2 is removed together with the spool 3 for reel maintenance or otherwise, due to the viscosity of the grease or to friction it can happen that the ratchet wheel 50 will shift together with the spool shaft 2. However, here the ratchet wheel 50 is anchored by the braces 55. This makes the ratchet wheel 50 stay on the side plate 10 even if it comes off the boss 36b when the spool shaft 2 is removed together with the spool 3. Thus, when the spool shaft 2 is removed/attached, the graspers 52 fitted on the ratchet pawls 51 will not be deformed or otherwise damaged.

(Other Embodiments)

(a) In the foregoing embodiment, an anti-reverse mechanism employed in a lever-drag type drag mechanism in which the link member is the spool shaft was explained as an example, but the present invention is applicable to anti-reverse mechanisms employed in star-drag type drag mechanisms in which the link member is the handle shaft.

(b) In the foregoing embodiment, the urging means were constituted by graspers that grasp either lateral face of the ratchet wheel 50, but the urging means may be for contacting only that lateral face on the spool side.

(c) In the foregoing embodiment, the ratchet wheel 50 is non-rotatably, axially immovably fitted via the friction disk 36 to the spool shaft 2, but may be fitted directly to the spool shaft 2.

According to the present invention, a rotary member is fitted free to shift axially onto a link member, and meanwhile is anchored against the reel body by anchoring means. When the link member is removed/attached, the rotary member therefore stays in the reel body and does not shift axially. Thus, the urging members to which the pawls are fitted are not liable to deform when the link member is removed/attached.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A dual-bearing reel anti-reverse mechanism for governing rotation of the dual-bearing reel spool, rotatively fitted in the reel body, in the line reeling-out direction, the anti-reverse mechanism comprising:

a rotary member having a plurality of teeth formed circumferentially spaced on its outer periphery, fitted non-rotatably yet free to shift axially onto a link member for rotationally co-operative linking with the spool;

a pawl member mounted on the reel body to allow its leading end to pivot between a contact posture in which the leading end of said pawl member contacts said teeth and a separated posture in which the leading end is parted away from said teeth, and being mounted such that when disposed in the contact posture said pawl member prohibits rotation of said rotary member in the line reel-out direction;

anchoring means provided on the reel body, for anchoring said rotary member against the reel body; and urging means fitted to said pawl member, for urging under friction with said rotary member said pawl member toward the separated posture when said rotary member is line wind-in directionally rotated and urging said pawl member toward the contact posture when said rotary member is line reel-out directionally rotated.

2. The dual-bearing reel anti-reverse mechanism as set forth in claim 1, wherein said urging means is provided on said pawl member and has a grasping member 52a for resiliently grasping either lateral face of said rotary member.

3. The dual-bearing reel anti-reverse mechanism as set forth in claim 1, wherein said anchoring means is for anchoring said pawl member to the reel body.

4. The dual-bearing reel anti-reverse mechanism as set forth in claim 1, further comprising alignment means for enabling said rotary member to align with respect to the reel body such that the rotational axes of said rotary member and of said link member coincide.

5. The dual-bearing reel anti-reverse mechanism as set forth in claim 1, wherein said anchoring means is a plate-shaped member fixed to the reel body, and is disposed with one end in a position opposing the lateral face of said rotary member reverse to the reel body.

6. The dual-bearing reel anti-reverse mechanism as set forth in claim 1 wherein said link member is a spool shaft for rotatively supporting the spool.

7. The dual-bearing reel anti-reverse mechanism as set forth in claim 1 wherein said link member is a shaft for a spool-cranking handle.

* * * * *